US012143782B2

(12) United States Patent
Lai et al.

(10) Patent No.: US 12,143,782 B2
(45) Date of Patent: Nov. 12, 2024

(54) MICROPHONE SYSTEM

(71) Applicant: British Cayman Islands Intelligo Technology Inc., Grand Cayman (KY)

(72) Inventors: Hsueh-Ying Lai, Zhubei (TW); Chih-Sheng Chen, Zhubei (TW); Chien-Hua Hsu, Zhubei (TW); Hua-Jun Hong, Zhubei (TW); Tsung-Liang Chen, Zhubei (TW)

(73) Assignee: BRITISH CAYMAN ISLANDS INTELLIGO TECHNOLOGY INC., Grand Cayman (KY)

( * ) Notice: Subject to any disclaimer, the term of this patent is extended or adjusted under 35 U.S.C. 154(b) by 202 days.

(21) Appl. No.: 17/974,323

(22) Filed: Oct. 26, 2022

(65) Prior Publication Data

US 2023/0283951 A1 Sep. 7, 2023

Related U.S. Application Data

(60) Provisional application No. 63/317,078, filed on Mar. 7, 2022.

(51) Int. Cl.
*H04R 3/00* (2006.01)
*H04R 1/40* (2006.01)

(52) U.S. Cl.
CPC ............ *H04R 3/005* (2013.01); *H04R 1/406* (2013.01); *H04R 2201/401* (2013.01)

(58) Field of Classification Search
CPC ......... G06F 3/16; G10L 21/0308; H04R 1/40; H04R 1/406; H04R 3/00; H04R 3/005; H04R 2201/401

(Continued)

(56) References Cited

U.S. PATENT DOCUMENTS

| | | | |
|---|---|---|---|
| 9,053,697 | B2 | 6/2015 | Park et al. |
| 11,302,313 | B2 | 4/2022 | Li |

(Continued)

FOREIGN PATENT DOCUMENTS

| | | | |
|---|---|---|---|
| CN | 102947878 | B | 11/2014 |
| EP | 3 035 249 | A1 | 6/2016 |

(Continued)

OTHER PUBLICATIONS

Choi et al., "*Phase-aware speech enhancement with deep complex U-net*", conference paper at ICRL 2019, 20 pages, 2019.

(Continued)

*Primary Examiner* — Harry S Hong
(74) *Attorney, Agent, or Firm* — MUNCY, GEISSLER, OLDS & LOWE, P.C.

(57) ABSTRACT

A microphone system is disclosed, comprising: a microphone array and a processing unit. The microphone array comprises Q microphones that detect sound and generate Q audio signals. The processing unit is configured to perform operations comprising: spatial filtering over the Q audio signals using a trained model based on at least one target beam area (TBA) and coordinates of the Q microphones to generate a beamformed output signal originated from ω target sound source inside the at least one TBA, where ω>=0. Each TBA is defined by r time delay ranges for r combinations of two microphones out of the Q microphones, where Q>=3 and r>=1. A dimension of a first number for locations of all sound sources able to be distinguished by the processing unit increases as a dimension of a second number for a geometry formed by the Q microphones increases.

15 Claims, 14 Drawing Sheets

(58) Field of Classification Search
USPC .................................................... 381/92, 122
See application file for complete search history.

(56) References Cited

U.S. PATENT DOCUMENTS

| | | | | |
|---|---|---|---|---|
| 2008/0187152 | A1* | 8/2008 | Kim | G10L 21/0208 381/92 |
| 2008/0247274 | A1* | 10/2008 | Seltzer | G01S 3/8083 702/194 |
| 2011/0026732 | A1* | 2/2011 | Buck | H04R 29/005 381/92 |
| 2015/0088500 | A1* | 3/2015 | Conliffe | H04M 9/082 704/235 |
| 2017/0325020 | A1* | 11/2017 | Wolff | G10L 21/0216 |
| 2019/0387311 | A1* | 12/2019 | Schultz | H04R 1/406 |
| 2020/0374624 | A1* | 11/2020 | Koschak | G10K 11/178 |
| 2021/0092548 | A1* | 3/2021 | McElveen | H04S 7/307 |
| 2021/0099796 | A1* | 4/2021 | Usami | H04R 3/005 |
| 2021/0150873 | A1 | 5/2021 | Shouldice et al. | |
| 2021/0219053 | A1* | 7/2021 | Masnadi-Shirazi | H04R 1/406 |

FOREIGN PATENT DOCUMENTS

| | | |
|---|---|---|
| TW | 201640422 A | 11/2016 |
| TW | 201921336 A | 6/2019 |

OTHER PUBLICATIONS

U.S. Pat. No. 9,053,697 B2 is an English language family member of CN 102947878 B.
U.S. Pat. No. 11,302,313 B2 is an English language family member of TW 201921336 A.
EP 14382553.7 is an English language family member of TW 201640422 A.

* cited by examiner

TYPE 3A

TYPE 3B

700T

MICROPHONE SYSTEM

CROSS-REFERENCE TO RELATED APPLICATION

This application claims priority under 35 USC 119(e) to U.S. provisional application No. 63/317,078, filed on Mar. 7, 2022, the content of which is incorporated herein by reference in its entirety.

BACKGROUND OF THE INVENTION

Field of the Invention

The invention relates to audio processing, and more particularly, to a microphone system to solve mirror issues and improve microphone directionality.

Description of the Related Art

Beamforming techniques use the time differences between channels that results from the spatial diversity of the microphones to enhance the reception of signals from desired directions and to suppress or eliminate the undesired signals coming from other directions. FIG. 1A is an example diagram of two microphones and a sound source. Referring to FIG. 1A, for a microphone array having two microphones 101 and 102, once a time delay t is obtained, the angle $\alpha$ (i.e., either a direction of a sound source or a source direction) can be calculated with the help of trigonometric calculations, but the location/distance of the sound source cannot be obtained. In the example of FIG. 1B, if a direction of a sound source falls within the desired time delay ranging from $\tau$1 to $\tau$2 (i.e., a beam area BA0), then the sound source is called "inside beam" (will be described below). The two microphones 101 and 102 are symmetric about the X axis with equal sensitivity in all other dimensions, thus raising a mirror issue. That is to say, the two microphones 101 and 102 can distinguish the source directions on the right side from the left side, but have difficulty in distinguishing the source directions on the front side from the back side and in distinguishing the source directions on the upper side from the lower side (called "x-distinguishable and yz-mirror).

Accordingly, what is needed is a microphone system to solve the mirror issue and provide improved microphone directionality. The invention addresses such a need.

SUMMARY OF THE INVENTION

In view of the above-mentioned problems, an object of the invention is to provide a microphone system capable of solving mirror issues and improving microphone directionality.

One embodiment of the invention provides a microphone system. The microphone system comprises a microphone array and a processing unit. The microphone array comprises Q microphones that detect sound and generate Q audio signals. The processing unit is configured to perform a set of operations comprising: performing spatial filtering over the Q audio signals using a trained model based on at least one target beam area (TBA) and coordinates of the Q microphones to generate a beamformed output signal originated from $\omega$ target sound sources inside the at least one TBA, where $\omega$>=0. Here, each TBA is defined by r time delay ranges for r combinations of two microphones out of the Q microphones, where Q>=3 and r>=1. A dimension of a first number for locations of all sound sources able to be distinguished by the processing unit increases as a dimension of a second number for a geometry formed by the Q microphones increases.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1A:
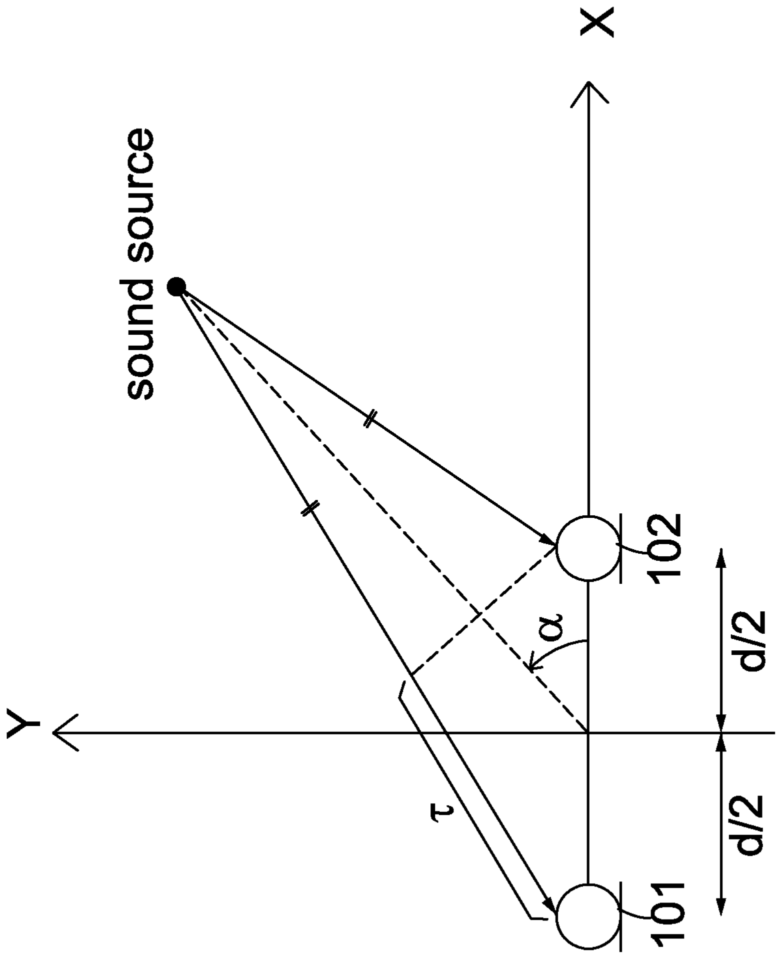
FIG. 1A (PRIOR ART)
FIG. 1A is an example diagram of two microphones and a sound source.

As used herein and in the claims, the term "and/or" includes any and all combinations of one or more of the associated listed items. The use of the terms "a" and "an" and "the" and similar referents in the context of describing the invention are to be construed to cover both the singular and the plural, unless otherwise indicated herein or clearly contradicted by context. Throughout the specification, the same components with the same function are designated with the same reference numerals.

Figure 2:
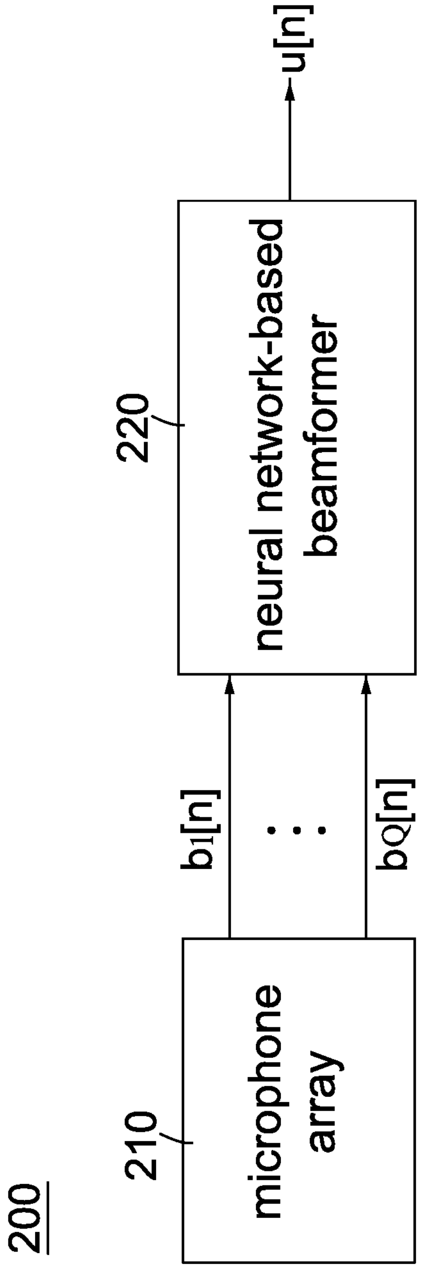
FIG. 2 is schematic diagram of a microphone system according to the invention.

FIG. 2 is schematic diagram of a microphone system according to the invention. Referring to FIG. 2, a microphone system 200 of the invention, applicable to an electronic device (not shown), includes a microphone array 210 and a neural network-based beamformer 220. The microphone array 210 includes Q microphones 211~21Q configured to detect sound to generate Q audio signals $b_1[n]$~$b_Q[n]$, where Q>=3. The neural network-based beamformer 220 is used to perform spatial filtering operation with or without denoising operation over the Q audio signals received from the microphone array 210 using a trained model (e.g., a trained neural network 760T in FIGS. 7C~7D) based on at least one target beam area (TBA), a set M of microphone coordinates of the microphone array 210 and zero or one or two energy losses (will be described below) to generate a clean/noisy beamformed output signal u[n] originated from a target sound sources inside the TBA, where n denotes the discrete time index, and ω>=0.

A set of microphone coordinates for the microphone array 210 is defined as $M=\{M_1, M_2, \ldots, M_Q\}$, where $M_i=(x_i, y_i, z_i)$ denotes coordinates of for microphone 21*i* relative to a reference point (not shown) at the electronic device and 1<=i<=Q. Let a set of sound sources $S \subseteq \mathbb{R}^3$ and $t_{gi}$ denotes a propagation time of sound from a sound source $s_g$ to a microphone 21*i*, a location $L(s_g)$ of the sound source $s_g$ relative to the microphone array 210 is defined by R time delays for R combinations of two microphones out of the Q microphones as follows: $L(s_g)=\{(t_{g1}-t_{j2}), (t_{g1}-t_{g3}), \ldots, (t_{g1}-t_{gQ}), \ldots, (t_{g(Q-1)}-t_{gQ})\}$, where $\mathbb{R}^3$ denotes a three-dimensional space, 1<=g<=Z, $S \supseteq \{s_1, \ldots, s_z\}$, Z denotes the number of sound sources, and R=Q!/((Q−2)!×2!). A beam area (BA) is defined by R time delay ranges for R combinations of two microphones out of the Q microphones as follows: $BA=\{(TS_{12}, TE_{12}), (TS_{13}, TE_{13}), \ldots, (TS_{1Q}, TE_{1Q}), \ldots, (TS_{(Q-1)1}, TE_{(Q-d\ 1)1}), \ldots, (TS_{(Q-1)Q}, TE_{(Q-1)Q})\}$, where $TS_{ik}$ and $TE_{ik}$ respectively denote a lower limit and a upper limit of a time delay range for the two microphones 21*i* and 21*k*, *i*≠k and 1<=k<=Q. If all the time delays for the location $L(s_g)$ of the sound source $s_g$ fall within the time delay ranges of the beam area, then it is determined that the sound source $s_g$ is located inside the beam area BA or called "inside beam" for short. For example, given that Q=3, BA={(−2 ms, 1 ms), (−3 ms, 2 ms), (−2 ms, 0 ms)} and propagation times from a sound source $s_1$ to three microphones 211~213 are respectively equal to 1 ms, 2 ms and 3 ms, then the location of sound source $s_1$ would be: $L(s_1)=\{(t_{11}-t_{12}), (t_{11}-t_{13}), (t_{12}-t_{13})\}=\{-1\text{ ms}, -2\text{ ms}, -1\text{ ms}\}$. Since $TS_{12}<(t_{11}-t_{12})<TE_{12}$, $TS_{13}<(t_{11}-t_{13})<TE_{13}$ and $TS_{23}<(t_{12}-t_{13})<TE_{23}$, it is determined that the sound source $s_1$ is located inside the beam area BA.

Figure 1B:
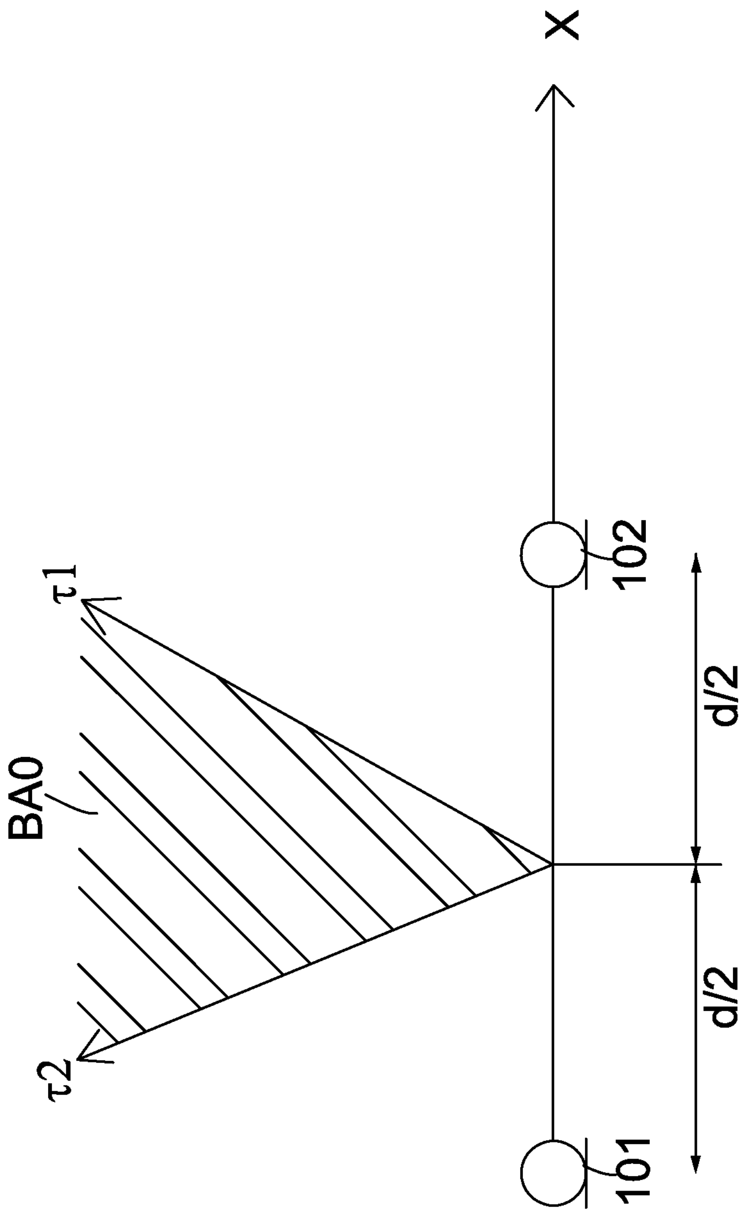
FIG. 1B (PRIOR ART)
FIG. 1B is an example beam area BA0 within the desired time delay range from $\tau$1 to $\tau$2.
Figure 3A:
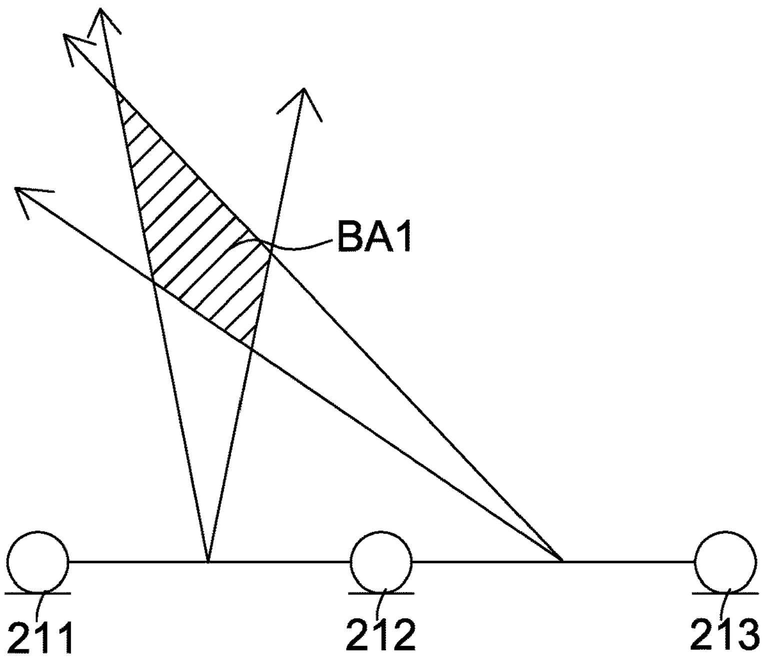
FIGS. 3A-3B show two examples of beam areas BA1 and BA2 along with three collinear microphones 211~213.
Figure 3B:
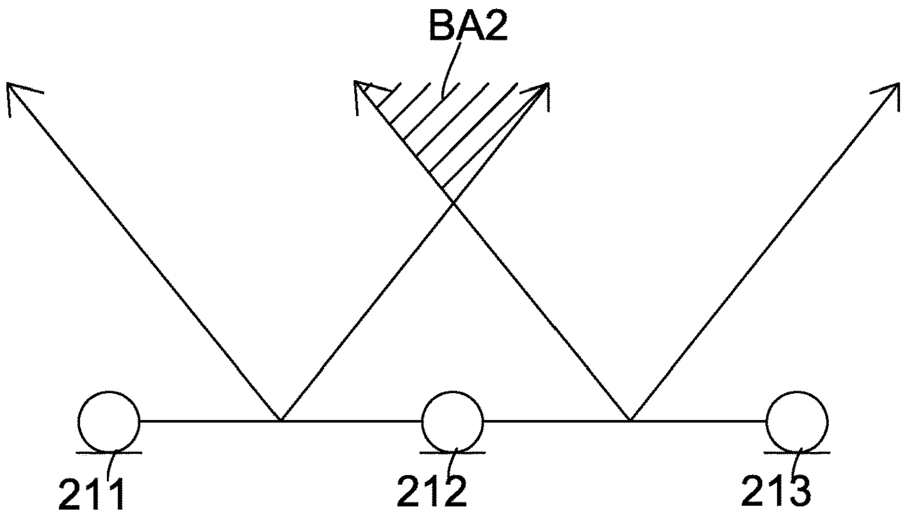

FIGS. 3A-3B show two examples of beam areas BA1 and BA2 along with three collinear microphones 211~213. The range of a BA may be a closed area (e.g., BA1 in FIG. 3A) or a semi-closed area (e.g., BA2 in FIG. 3B). The three collinear microphones 211~213 (i.e., Q=3) are provided by example, and not limitations of the invention. The geometry of the microphone array 210 is adjustable depending on different needs. Since the range of each beam area BA1 and BA2 in FIGS. 3A-3B is defined by three time-delay ranges for three pairs of microphones in the microphone array 210, the ranges of the beam areas BA1 and BA2 are "at a distance from" the microphone array 210, in comparison with the range of BA0 that adjoins the microphone array 210 in FIG. 1B.

Through the specification and claims, the following notations/terms take the meanings explicitly associated herein, unless the context clearly dictates otherwise. The term "sound source" refers to anything producing audio information, including people, animals, or objects. Moreover, the sound source can be located at any locations in three-dimensional spaces relative to a reference point (e.g., a middle point among the Q microphones 211-21Q) at the electronic device. The term "target beam area (TBA)" refers to a beam area located in desired directions or a desired coordinate range, and audio signals from all target sound sources (TSS) inside the TBA need to be preserved or enhanced. The term "cancel beam area (CBA)" refers to a beam area located in un-desired directions or an un-desired coordinate range, and audio signals from all cancel sound sources inside the CBA need to be suppressed or eliminated.

The microphones 211-21Q in the microphone array 210 may be, for example, omnidirectional microphones, bi-directional microphones, directional microphones, or a combination thereof. Please note that when directional or bi-directional microphones are included in the microphone array 210, a circuit designer needs to ensure the directional or bi-directional microphones are capable of receiving all the audio signal originated from target sound sources inside the at least one TBA.

As set forth above, the beamformer 220 may perform spatial filtering operation over Q audio signals from the microphone array 210 based on at least one TBA, the set M of microphone coordinates and zero or one or two energy losses to generate a beamformed output signal u[n] originated from ω target sound sources inside the at least one TBA, where ω>=0. However, a microphone array may face a mirror issue due to its microphone geometry. The geometry/layout of the microphone array 210 assisting the beamformer 220 in distinguishing different sound source locations is divided into three ranks as follows. (1) rank(M)=3: the layout or geometry of Q microphones 211~21Q forms a three-dimensional (3D) shape (neither collinear nor coplanar) so that each set of time delays in $L(s_g)$ received by the Q microphones are unique enough for the beamformer 220 to locate the sound source $s_g$ in 3D space. In geometry, the 3D shape is a shape or figure that has three dimensions, such as length, width and height (such as the example of FIG. 6C). (2) rank(M)=2: the Q microphones 211~21Q forms a plane (coplanar but not collinear) so that beamformer 220 can determine the locations of first sound sources along a first axis and a second axis (forming the plane), but is unable to distinguish locations of any pair of second sound sources symmetrical to the plane and located along a third axis. (3) rank(M)=1: the Q microphones are arranged collinearly (i.e., forming a line along a first axis) so that beamformer 220 can determine the locations of first sound sources along the first axis, but is unable to distinguish locations of second sound sources symmetrical to the line and located along either a second axis or a third axis perpendicular to the first axis.

Maximum distinguishing rank for the capability of the beamformer 220 to distinguish different sound source locations based on only the geometry of the Q microphones 211~21Q is the smaller of two numbers (Q-1) and 3, where Q>=3. According to the invention, a distinguishing rank (DR) for the capability of the beamformer 220 can be escalated by changing a geometry of the microphone array 210 from a dimension of a lower number to a dimension of a higher number and/or by inserting zero or one or two spacers into the Q microphones (will be described below).

Figures 4A, 4B:
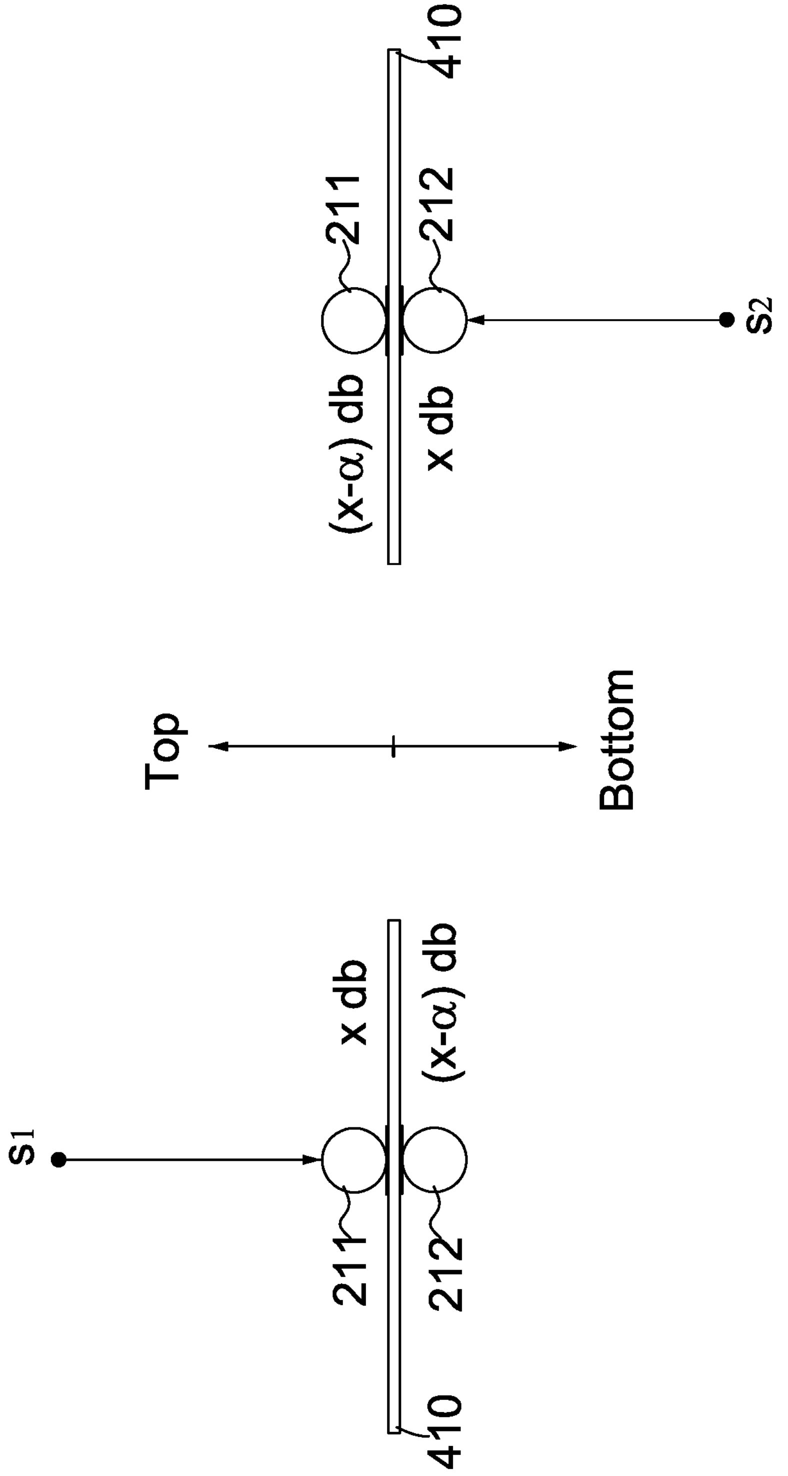
FIGS. 4A-4B show two examples of sound sources at opposite directions resulting in different energy values of audio signals from two microphones 211~212 disposed on two different sides of a spacer 410.

FIGS. 4A-4B show two examples of sound sources at opposite directions resulting in different energy values of audio signals from two microphones 211~212 disposed on two different sides of a spacer 410. Referring to FIGS. 4A-4B, it is assumed that two microphones 211~212 are omnidirectional microphones, arranged collinearly and separated by a spacer 410, and that locations of two sound sources $s_1$ and $s_2$ are symmetric to the spacer 410. The material for the spacer 410 is not limited as long as it can cause an energy loss when sound propagates through the spacer 410. For example, the spacer 410 includes, without limitations, a laptop screen, a mobile phone screen, a case/envelope for a monitor/headset/camera, and the like. When a sound source $s_1$ is located at the top of the spacer 410 as shown in FIG. 4A, the spacer 410 results in energy discrepancy in energy values (x dB and (x-$\alpha$) dB) of audio signals $b_1[n]$ and $b_2[n]$ from the two microphones 211-212, where $\alpha>0$. When a sound source $s_2$ is located at the bottom of the spacer 410 as shown in FIG. 4B, the spacer 410 results in energy discrepancy in energy values ((x-$\alpha$) dB and x dB) of the audio signals $b_1[n]$ and $b_2[n]$. In an embodiment, if the spacer 410 is implemented by a laptop screen, the energy loss a dB ranges from 2 dB to 5 dB. Thus, with the help of energy loss, even though the two symmetric sound sources $s_1$ and $s_2$ transmit sound to result in the same set of time delays, the directions of the sound sources $s_1$ and $s_2$ are easily identified by the beamformer 220.

According to the invention, both the geometry of the microphone array 210 and the number of spacers determine the distinguishing rank (DR) for the capability of the beamformer 220 to distinguish different sound source locations. FIGS. 5A-5D respectively show different layouts/geometry of three microphones 211-213 and zero or one spacer of Type 3A-3D.

Figure 5A:
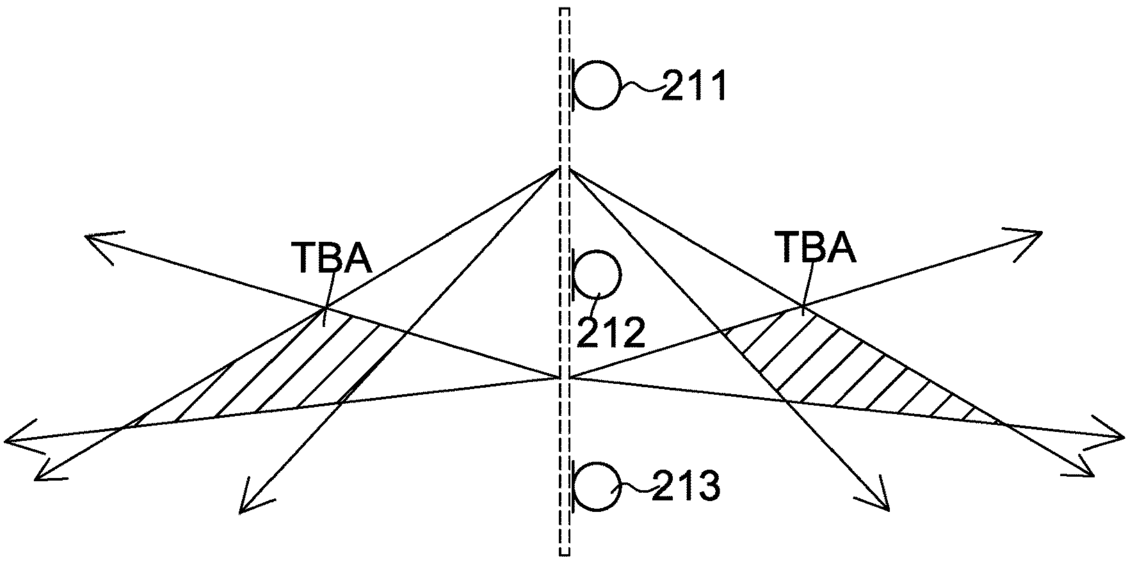
FIGS. 5A-5D respectively show layouts of three microphones 211-213 and zero or one spacer of Type 3A-3D.
Figure 5B:
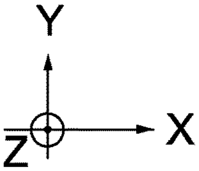
Figure 5B:
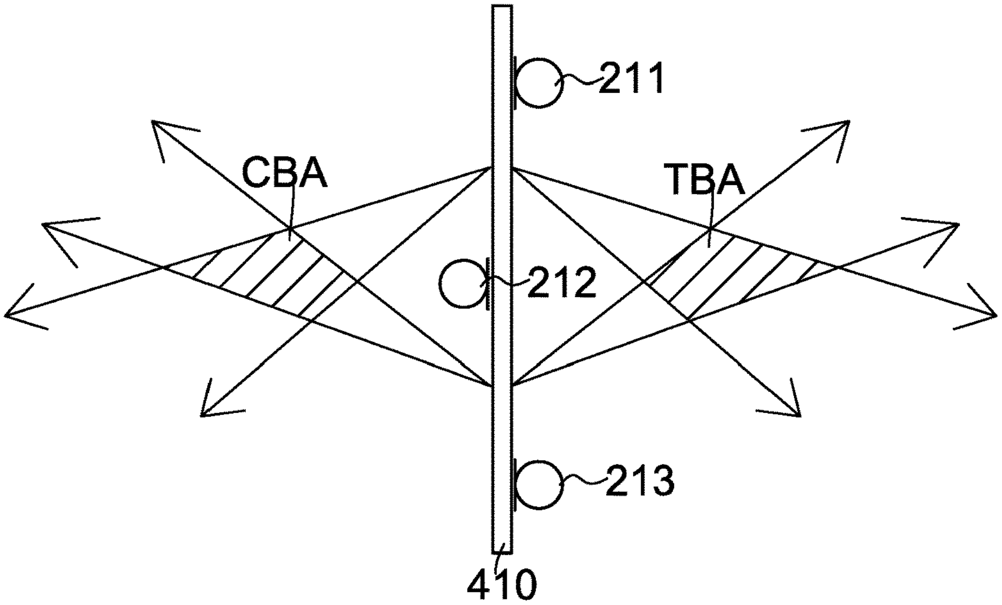
Figure 5C:
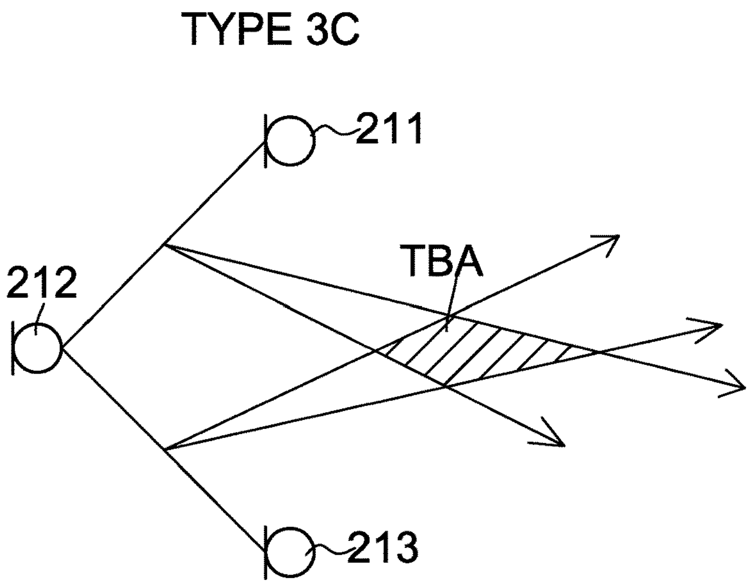
Figure 5D:
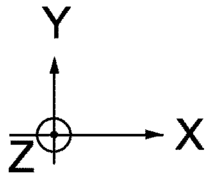
Figure 5D:
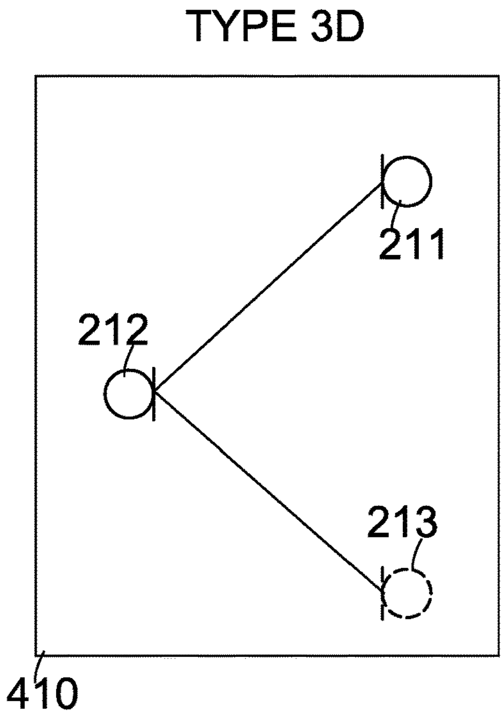

For Q=3, the location $L(s_g)$ of each sound source $s_g$ relative to the microphone array 210 is defined by three time delays for three combinations of two microphones out of three microphones 211~213. There are five types 3A-3E for layouts of microphones and spacers as follows. (1) Type 3A (DR=1): three microphones 211-213 in the microphone array 210 form a line along y axis (i.e., collinear) and no spacer is inserted, as shown in FIG. 5A. Based on input sets of time delays for locations of multiple sound sources (i.e., three time delays in each set of time delays), the beamformer 220 can distinguish different locations of first sound sources along y axis, but is unable to distinguish different locations of second sound sources symmetrical to the line and along either x axis or z axis (called "y-distinguishable and xz-mirror"). (2) Type 3B (DR=2): the three microphones 211-213 form a line along y axis (i.e., collinear) and one spacer 410 parallel to yz-plane is inserted. As shown in FIG. 5B, a left microphone 212 is separated from the other two right microphones 211 and 213 by a spacer 410. Please note that the spacer 410 is assumed to be "very thin", so that the three microphones are regarded as being disposed collinearly. The beamformer 220 can distinguish different locations of first sound sources along y axis by their corresponding sets of time delays and different locations of second sound sources along x axis by different energy values of audio signals $b_1[n]$-$b_3[n]$, but is unable to distinguish locations of third sound sources along z axis and symmetrical to the line (called "xy-distinguishable and z-mirror"). (3) Type 3C (DR=2): the three non-collinear microphones 211-213 form a xy-plane (i.e., coplanar) and no spacer is inserted, as shown in FIG. 5C. The beamformer 220 can distinguish different locations of first sound sources along x axis and y axis by their corresponding sets of time delays, but is unable to distinguish different locations of second sound sources along z axis and symmetrical to the xy plane (called "xy-distinguishable and z-mirror"). (4) Type 3D (DR=3): the three non-collinear microphones 211-213 form a plane (i.e., coplanar) and a spacer 410 parallel to xy-plane is inserted. As shown in FIG. 5D, a lower microphone 213 is separated from the other two upper microphones 211-212 by the spacer 410. Please note that the spacer 410 is assumed to be very thin, so that the three microphones are regarded as being disposed on the xy plane. The beamformer 220 can distinguish different locations of first sound sources along x axis and y axis by their corresponding sets of time delays and different locations of second sound sources along z axis by different energy values of audio signals $b_1[n]$-$b_3[n]$ (called "xyz-distinguishable").

Figure 5E:
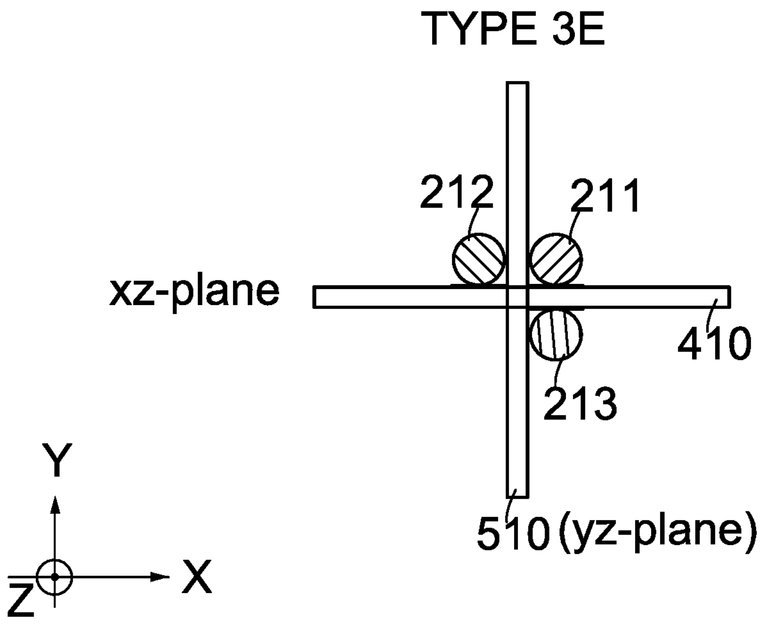
FIGS. 5E-5F show two different side views of three microphones 211-213 and two spacers of Type 3E.
Figure 5F:
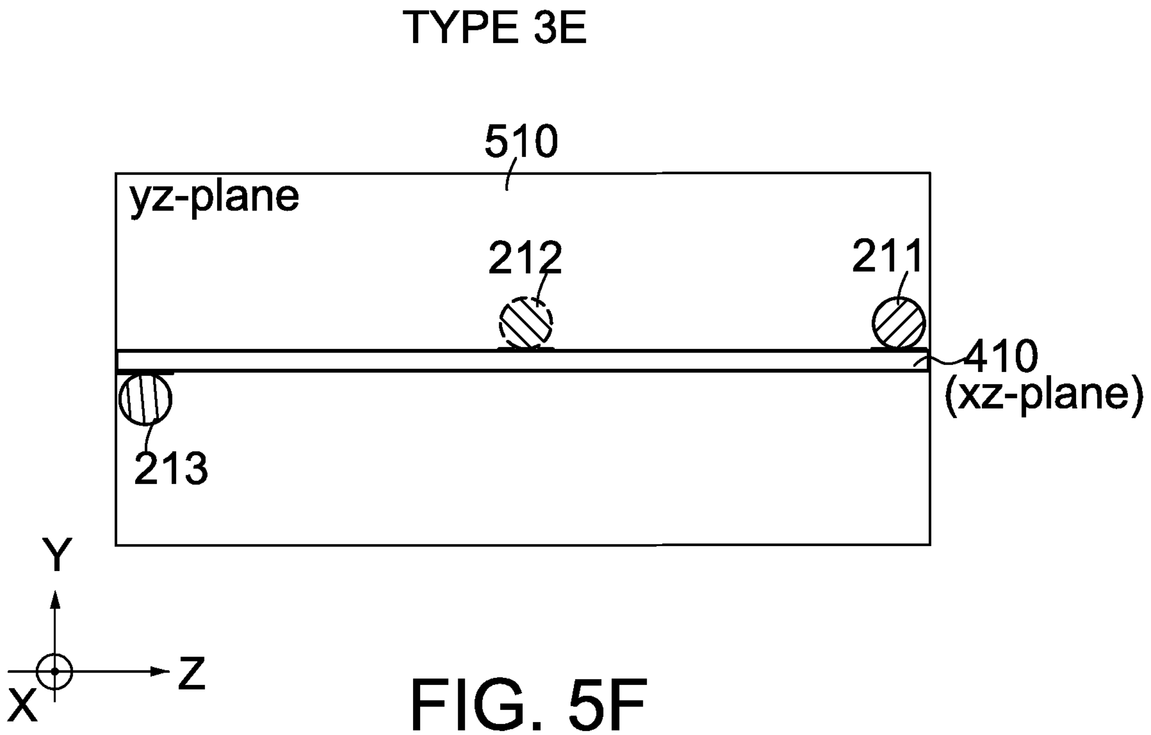

FIGS. 5E-5F show two different side views of three microphones 211-213 and two spacers of Type 3E. (5) Type 3E (DR=3): the three microphones 211-213 are arranged collinearly and both a spacer 410 (parallel to xz-plane) and a spacer 510 (parallel to yz-plane) are inserted to divide the three microphones 211-213 into three different groups located in different quadrants, as shown in FIGS. 5E-5F. Please note that the spacers 410 and 510 are assumed to be very thin, so that the three microphones are regarded as being arranged collinearly. The side view in FIG. 5E is rotated 90° counterclockwise about y axis to obtain the side view in FIG. 5F. Referring to FIG. 5E, assuming that the space is divided into four semi-closed regions, herein called quadrants, by two spacers 410 and 510, then the microphone 211 lies in the first quadrant, the microphone 212 lies in the second quadrant, and the microphone 213 lies in the fourth quadrant. With the two spacers 410 and 510 that separate the three microphones, a sound source lying in different quadrants and transmitting sound results in different energy values E1-E3 of audio signals $b_1[n]$-$b_3[n]$ from microphones 211~213. For example, when a sound source in the first quadrant transmits sound, the sound propagating through the two spacers 410 and 510 and arriving at two microphones 212-213 respectively cause different energy losses depending on the materials of the spacers 410 and 510. Assuming that the sound propagation through the spacer 410 would cause an energy loss of a dB, the sound propagation through the spacer 510 would cause an energy loss of $\beta$ dB, and the sound propagation through both the spacers 410 and 510 would cause an energy loss of $(\alpha+\beta)$ dB, where $\alpha>\beta>0$. The beamformer 220 determines a sound source lies in the first quadrant if $E1>E2(=E1-\beta)>E3(=E1-\alpha)$, a sound source lies in the second quadrant if $E2>E1(=E2-\beta)>E3(=E2-\alpha-\beta)$, a sound source lies in the third quadrant if $E1<E2<E3$, and a sound source lies in the fourth quadrant if $E3>E1(=E3-\alpha)>E2(=E3-\alpha-\beta)$. Accordingly, in Type 3E, the beamformer 220 can distinguish the locations of first sound sources along z axis by their corresponding sets of time delays and the locations of second sound sources along x axis and y axis by different energy values of audio signals $b_1[n]$-$b_3[n]$ (called "xyz-distinguishable").

For Q=4, the location $L(s_g)$ of each sound source $s_g$ relative to the microphone array 210 is defined by six time delays for six combinations of two microphones out of four microphones 211-214. There are six types 4A-4F for layouts of microphones and spacers as follows. (1) Type 4A (DR=1): four microphones 211-214 in the microphone 210 are arranged collinearly along y axis and no spacer is inserted, similar to the layout in FIG. 5A (i.e., "y-distinguishable and xz-mirror"). (2) Type 4B (DR=2): the four microphones 211-214 are arranged collinearly along y axis and one spacer 410 parallel to yz-plane is included. Similar to the layout in FIG. 5B, at least one left microphone is separated from the other right microphones by a spacer 410 (i.e., "xy-distinguishable and z-mirror"). (3) Type 4C (DR=2): the four non-collinear microphones 211-214 form a xy plane (i.e., coplanar) and no spacer is inserted, similar to FIG. 5C (i.e., "xy-distinguishable and z-mirror"). (4) Type 4D (DR=3): the four non-collinear microphones 211-214 form a plane (i.e., coplanar) and a spacer 410 parallel to xy-plane is inserted.

Figure 6A:
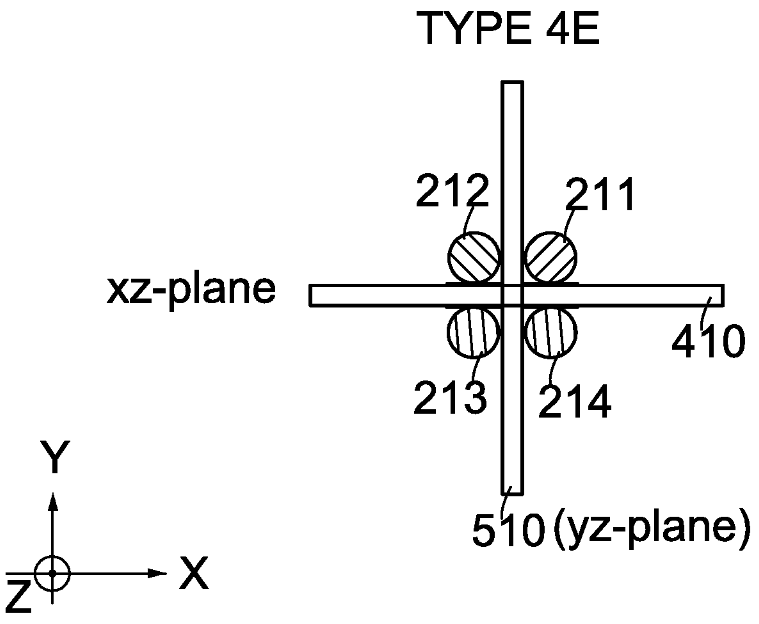
FIGS. 6A-6B show two different side views of the four microphones 211-214 and two spacers of Type 4E.
Figure 6B:
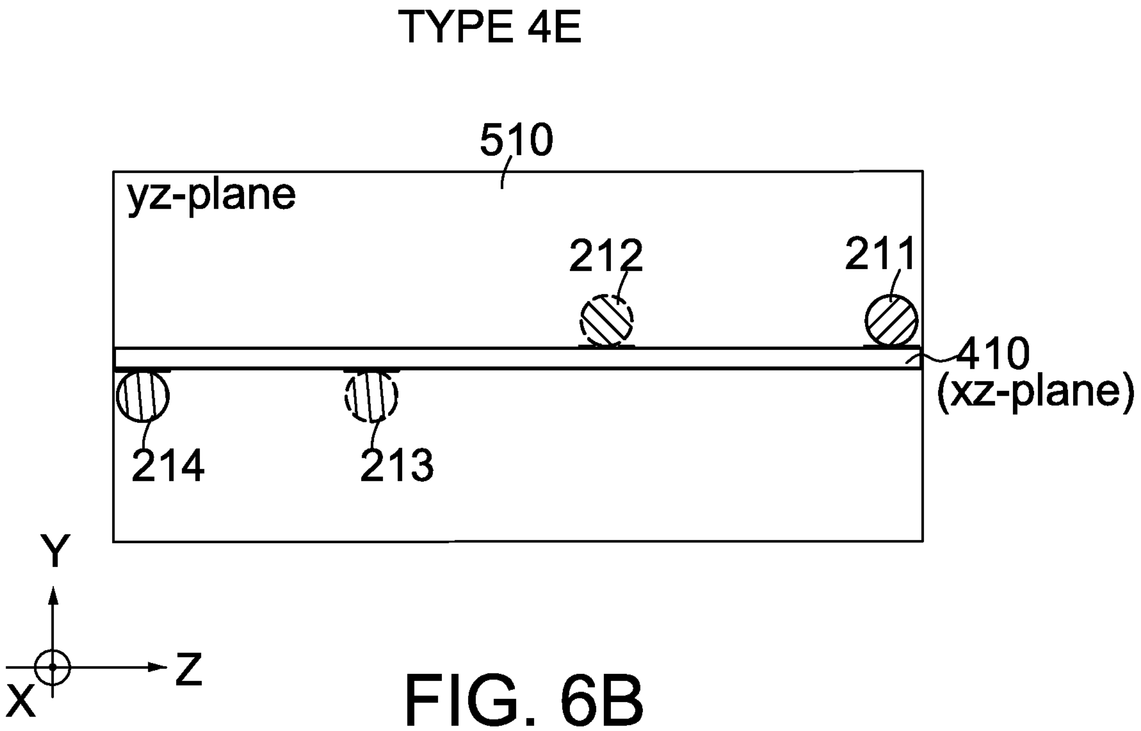
Figure 6C:
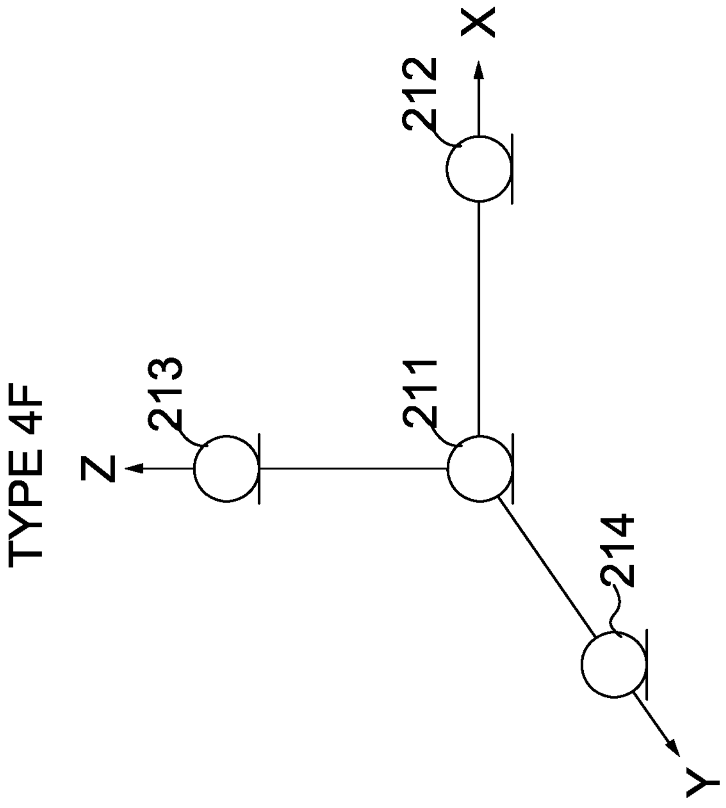
FIG. 6C shows an exemplary layout of the four microphones 211-214 of Type 4F.

Similar to the layout in FIG. 5D, at least one lower microphone is separated from the other upper microphones by the spacer 410. Please note that the spacer 410 is assumed to be very thin, so that the four microphones are regarded as being disposed on the xy plane. (i.e., "xyz-distinguishable"). (5) Type 4E (DR=3): four microphones 211-214 are arranged collinearly along z axis and two spacers 410 and 510 (parallel to xz plane and yz-plane, respectively) are inserted to divide the four microphones 211-214 into four different groups located in different quadrants. FIGS. 6A-6B show two different side views of the four microphones 211-214 and two spacers of Type 4E. Please note that the spacers 410 and 510 are assumed to be very thin, so that the four microphones are regarded as being arranged collinearly. The side view in FIG. 6A is rotated 90° counterclockwise about y axis to obtain the side view in FIG. 6B. With the two spacers 410 and 510 that separate the four microphones, a sound source lying in different quadrants and transmitting sound results in different energy values E1-E4 of audio signals $b_1[n]$-$b_4[n]$ from the four microphones 211-214. As set forth above, it is assumed that the sound propagation through the spacer 410 would cause an energy loss of α dB, the sound propagation through the spacer 510 would cause an energy loss of β dB, and the sound propagation through the spacers 410 and 510 would cause an energy loss of (α+β dB, where α>β>0. The beamformer 220 determines a sound source lies in the first quadrant if E1>E2(=E1−β)>E4(=E1−α)>E3(=E1−α−β), a sound source lies in the second quadrant if E2>E1(=E2−β)>E3(=E2−α)>E4(=E2−α−β), a sound source lies in the third quadrant if E3>E4 (=E3−β)>E2 (=E3−α)>E1(=E3−α−β) and a sound source lies in the fourth quadrant if E4>E3(=E4−β)>E1(=E4−α)>E2(=E4−α−β). Accordingly, in Type 4E, the beamformer 220 can distinguish the locations of first sound sources along z axis by their corresponding sets of time delays and the locations of second sound sources along x axis and y axis by their energy discrepancy (i.e., "xyz-distinguishable"). Here, there are six time delays in each set of time delays representative of one sound source. (6) Type 4F (DR=3): the layout of the four microphones 211~214 forms a 3D shape (neither collinear nor coplanar) and no spacer is included. The beamformer 220 can locate sound sources by their corresponding sets of time delays (called "xyz-distinguishable") as shown in FIG. 6C. Please note that there are lots of layouts of the four microphones 211~214 that can form the 3D shape; FIG. 6C is an example of Type 4F, but not limitations of the invention.

Please note that in the examples of FIGS. 5E and 6A, the two spacers 410 and 510 are orthogonal and thus the four quadrants are equal. In an alternative embodiment, the two spacers 410 and 510 intersect, but are not orthogonal; thus, the sizes of the four quadrants are not equal. No matter whether the two spacers 410 and 510 are orthogonal, the beamformer 220 is able to determine which quadrant a sound source lies in based on different energy values of input audio signals $b_1[n]$~$b_Q[n]$.

In brief, three or more collinear microphones are used by the beamformer 220 to find locations of sound sources in one dimension (DR=1); besides, with the insertion of one or two spacers, the DR value would be escalated from 1 to 2 or 3. Three or more coplanar microphones are used by the beamformer 220 to find locations of sound sources in two dimensions (DR=2); besides, with the insertion of one spacer, the DR value would be escalated from 2 to 3. Four or more non-coplanar and non-collinear microphones that form a 3D shape are used by the beamformer 220 to find locations of sound sources in three dimensions (DR=3).

Referring back to FIG. 2, the beamformer 220 may be implemented by a software program, custom circuitry, or by a combination of the custom circuitry and the software program. For example, the beamformer 220 may be implemented using at least one storage device and at least one of a GPU (graphics processing unit), a CPU (central processing unit), and a processor. The at least one storage device stores multiple instructions or program codes to be executed by the at least one of the GPU, the CPU, and the processor to perform all the operations of the beamformer 220, as will be described in greater detail in FIGS. 7A-7D. Furthermore, persons of ordinary skill in the art will understand that any system that performs the operations of the beamformer 220 is within the scope and spirit of embodiments of the present invention.

Figure 7A:
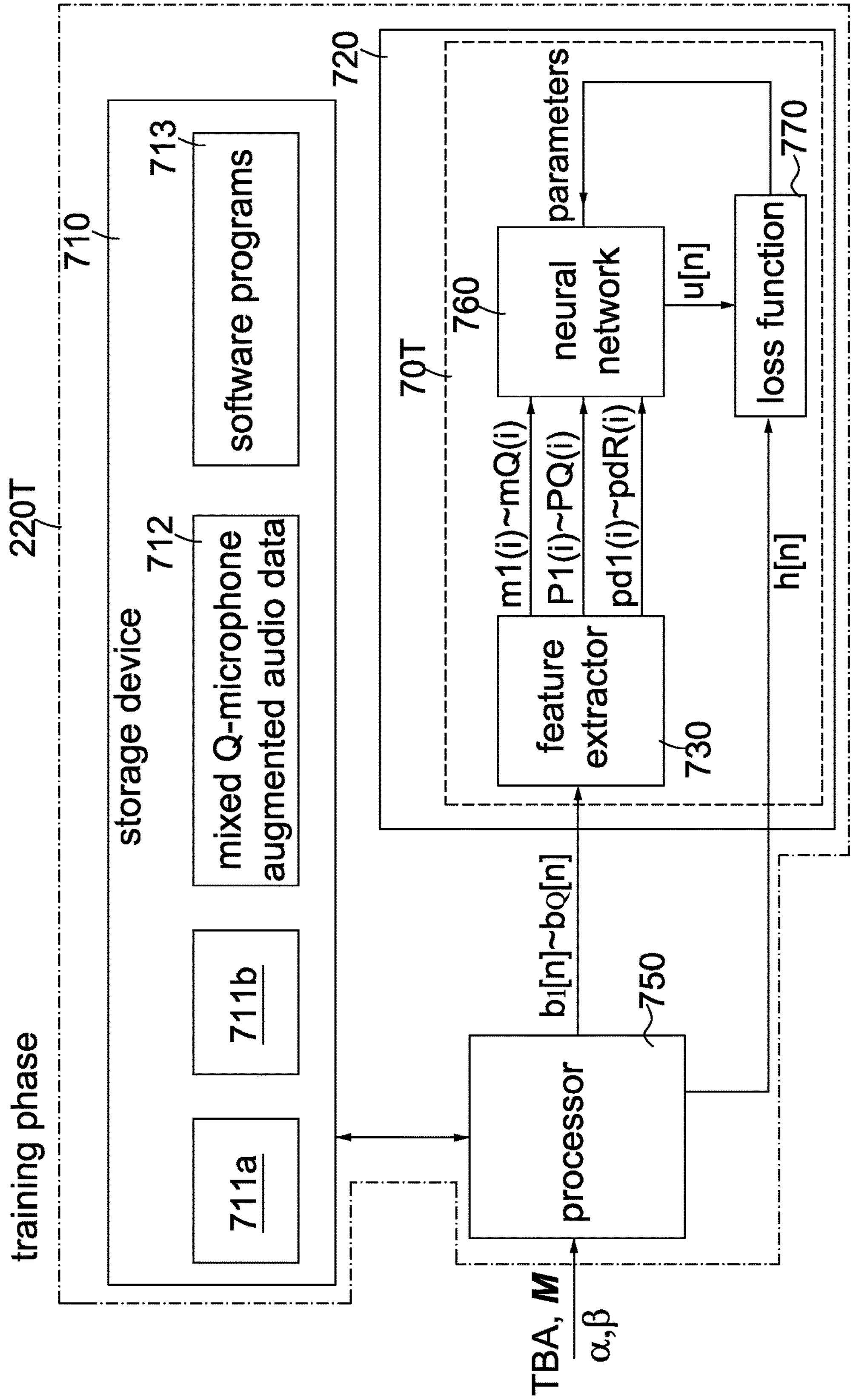
FIG. 7A is an exemplary diagram of a microphone system 700T in a training phase according to an embodiment of the invention.

FIG. 7A is an exemplary diagram of a microphone system 700T in a training phase according to an embodiment of the invention. In the embodiment of FIG. 7A, a microphone system 700T in a training phase includes a beamformer 220T that is implemented by a processor 750 and two storage devices 710 and 720. The storage device 710 stores instructions/program codes of software programs 713 operable to be executed by the processor 750 to cause the processor 750 to function as: the beamformer 220/220T/220*t*/220P. In an embodiment, a neural network module 70T, implemented by software and resident in the storage device 720, includes a feature extractor 730, a neural network 760 and a loss function block 770. In an alternative embodiment, the neural network module 70T is implemented by hardware (not shown), such as discrete logic circuits, application specific integrated circuits (ASIC), programmable gate arrays (PGA), field programmable gate arrays (FPGA), etc.

The neural network 760 of the invention may be implemented by any known neural network. Various machine learning techniques associated with supervised learning may be used to train a model of the neural network 760. Example supervised learning techniques to train the neural network 760 include, for example and without limitation, stochastic gradient descent (SGD). In the context of the following description, the neural network 760 operates in a supervised setting using a training dataset including multiple training examples, each training example including training input data (such as audio data in each frame of input audio signals $b_1[n]$ to $b_Q[n]$ in FIG. 7A) and training output data (ground truth) (such as audio data in each corresponding frame of output audio signals h[n] in FIG. 7A) pairs. The neural network 760 is configured to use the training dataset to learn or estimate the function $f$(i.e., a trained model 760T), and then to update model weights using the backpropagation algorithm in combination with the cost function block 770. Backpropagation iteratively computes the gradient of cost function relative to each weight and bias, then updates the weights and biases in the opposite direction of the gradient, to find a local minimum. The goal of a learning in the neural network 760 is to minimize the cost function given the training dataset.

As set forth above, there are five types 3A-3E for the layouts of three-microphone array and spacers (Q=3) and six types 4A-4E for the layouts of Q-microphone array and spacers (Q>=4). Please note that a neural network 760 in the beamformer 220T in cooperation with each type of the layouts needs to be trained "individually" with corresponding input parameters due to the fact that the set M of microphone coordinates of the microphone array 210, at least one TBA and the energy losses are varied according to different implementations. For example, a neural network 760 in the beamformer 220T in cooperation with one of Type 3A, 3C, 4A, 4C and 4F, needs to be trained with the set M of microphone coordinates of the microphone array 210, the at least one TBA and a training dataset (will be described below); a neural network 760 in the beamformer 220T in cooperation with one of Type 3B, 3D, 4B and 4D, needs to be trained with the set M of microphone coordinates of the microphone array 210, the at least one TBA, a α-dB energy loss for the spacer 410 and the training dataset; a neural network 760 in the beamformer 220T in cooperation with one of Type 3E and 4E, needs to be trained with the set M of microphone coordinates of the microphone array 210, the at least one TBA, the training dataset, a α-dB energy loss for the spacer 410 and a β-dB energy loss for the spacer 510.

As set forth above, a BA is defined by R time delay ranges for R combinations of two microphones out of the Q microphones in the microphone array 210. Each TBA that is fed to the processor 750 in FIG. 7A can be defined by two options, in addition to by the R time delay ranges for the R combinations. In a first option (no spacers are inserted into the microphone array 210 (such as Type 3A, 4A, 3C, 4C and 4F)): each TBA can be defined by r1 time delay ranges for r1 combinations of two microphones out of the Q microphones, where r1>=ceiling(2/Q) and the union of the r1 combinations of two microphones out of the Q microphones is all the Q microphones. For example, if Q=3, each TBA can be defined by two time delay ranges for two combinations of two microphones out of the three microphones as follows: $\{(TS_{12}, TE_{12}), (TS_{23}, TE_{23})\}$; meanwhile, the union of the two combinations of two microphones out of the three microphones is all the three microphones. As another example, if Q=4, each TBA can be defined by two time delay ranges for two combinations of two microphones out of the four microphones. Given that TBA1 is defined by $\{(TS_{12}, TE_{12}), (TS_{23}, TE_{23})\}$ and TBA2 is defined by $\{(TS_{12}, TE_{12}), (TS_{34}, TE_{34})\}$, then the definition for TBA1 is wrong because the union of the two combinations of the two microphones is only the three microphones 211~213, and the definition for TBA2 is correct because the union of the two combinations of the two microphones is all the four microphones 211~214.

In a second option (one or more spacers are inserted into the microphone array 210 (such as Type 3B, 4B, 3D, 4D, 3E and 4E)): each TBA can be defined by r2 time delay ranges for r2 combinations of two microphones out of the Q microphones, where r2>=1. For example, for Type 3B, each TBA can be defined by one time delay range for one combination of two microphones as follows: $\{(TS_{13}, TE_{13})\}$, so that the beamformer 220 can distinguish different locations of first sound sources along y axis by their corresponding sets of time delays and different locations of second sound sources along x axis by energy losses. For Type 3D, each TBA can be defined by two time delay ranges for two combinations of two microphones as follows: $\{(TS_{12}, TE_{12}), (TS_{23}, TE_{23})\}$, so that the beamformer 220 can distinguish different locations of first sound sources along x axis and y axis by their corresponding sets of time delays and different locations of second sound sources along z axis by energy losses.

For purposes of clarity and ease of description, FIGS. 7A-7D are described with reference to Type 4E and FIGS. 6A-6B (i.e., Q=4 and with two spacers 410 and 420); however, the principles presented in FIGS. 7A-7D are fully applicable to other types as well.

In an offline phase (prior to the training phase), the processor 750 is configured to respectively collect and store a batch of time-domain single-microphone noise-free (or clean) speech audio data (with/without reverberation in different space scenarios) 711*a* and a batch of time-domain single-microphone noise audio data 711*b* into the storage device 710. For the noise audio data 711*b*, all sound other than the speech being monitored (primary sound) is collected/recorded, including markets, computer fans, crowd, car, airplane, construction, keyboard typing, multiple-person speaking, etc.

It is assumed that the whole space (where the microphone system 700T is disposed) minus the at least one TBA leaves a CBA. By executing one of the software programs 713 of any well-known simulation tools, such as Pyroomacoustics, stored in the storage device 710, the processor 750 operates as a data augmentation engine to construct different simulation scenarios involving Z sound sources, Q microphones and different acoustic environments based on the at least one TBA, the set M of microphone coordinates, two energy losses of a and 3 dB for the two spacers 410 and 510, the clean speech audio data 711*a* and the noise audio data 711*b*. Besides, ω target sound sources are placed inside the at least one TBA and E cancel sound sources are placed inside the CBA, where ω+ε=Z, and ω, ε,Z>=0. The main purpose of the data augmentation engine 750 is to help the neural network 760 to generalize, so that the neural network 760 can operate in different acoustic environments. Please note that besides the simulation tools (such as Pyroomacoustics), the software programs 713 may include additional programs (such as an operating system or application programs) necessary to cause the beamformer 220/220T/220*t*/220P to operate.

Specifically, with Pyroomacoustics, the data augmentation engine 750 respectively transforms the single-microphone clean speech audio data 711*a* and the single-microphone noise audio data 711*b* into Q-microphone augmented clean speech audio data and Q-microphone augmented noisy audio data, and then mixes the Q-microphone augmented clean speech audio data and the Q-microphone augmented noise audio data to generate and store a mixed Q-microphone time-domain augmented audio data 712 in the storage device 710. In particular, the Q-microphone noise audio data is mixed in with the Q-microphone augmented clean speech audio data at different mixing rates to produce the mixed Q-microphone time-domain augmented audio data 712 having a wide range of SNRs. In the training phase, the mixed Q-microphone time-domain augmented audio data 712 are used by the processor 750 as the training input data (i.e., input audio data $b_1[n]$-$b_Q[n]$) for the training examples of the training dataset; correspondingly, clean or noisy time-domain output audio data transformed from a combination of the clean speech audio data 711*a* and the noise audio data 711*b* (that are all originated from the ω target sound sources) are used by the processor 750 as the training output data (i.e., h[n]) for the training examples of the training dataset.

Figure 7B:
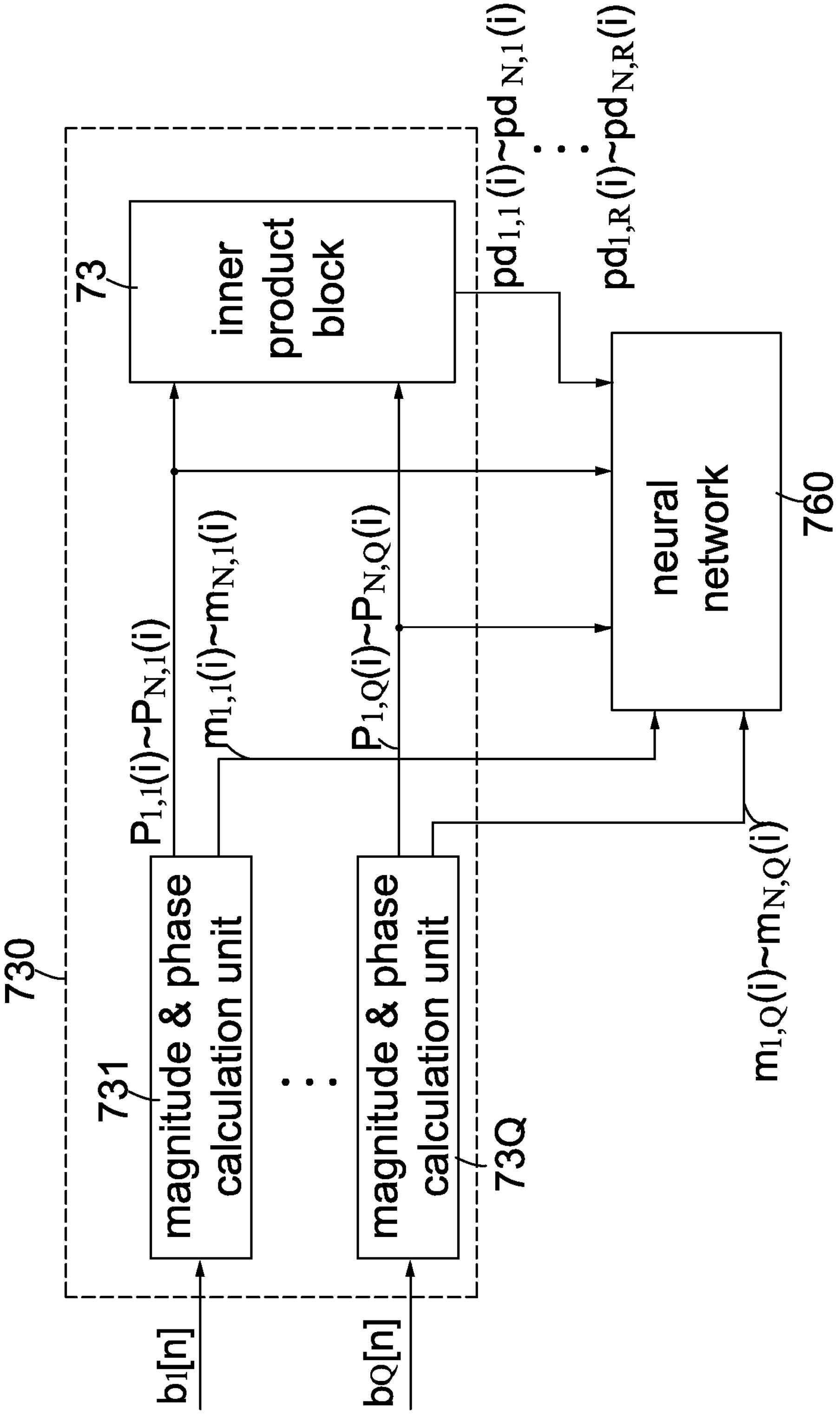
FIG. 7B is a schematic diagram of a feature extractor 730 according to an embodiment of the invention.

FIG. 7B is a schematic diagram of a feature extractor 730 according to an embodiment of the invention. Referring to FIG. 7B, the feature extractor 730, including Q magnitude & phase calculation units 731-73Q and an inner product block 73, is configured to extract features (e.g., magnitudes, phases and phase differences) from complex-valued samples of audio data of each frame in Q input audio streams ($b_1[n]$-$b_Q[n]$).

In each magnitude & phase calculation unit 73*j*, the input audio stream $b_j[n]$ is firstly broken up into frames using a sliding window along the time axis so that the frames overlap each other to reduce artifacts at the boundary, and then, the audio data in each frame in time domain are transformed by Fast Fourier transform (FFT) into complex-valued data in frequency domain, where 1=<j<=Q and n denotes the discrete time index. Assuming a number of sampling points in each frame (or the FFT size) is N, the time duration for each frame is Td and the frames overlap each other by Td/2, the magnitude & phase calculation unit 73*j* divides the input stream $b_j[n]$ into a plurality of frames and computes the FFT of audio data in the current frame i of the input audio stream $b_j[n]$ to generate a current spectral representation Fj(i) having N complex-valued samples ($F_{1,j}(i)$-$F_{N,j}(i)$) with a frequency resolution of fs/N(=1/Td), where 1<=j<=Q, i denotes the frame index of the input/output audio stream $b_j[n]$/u[n]/h[n], fs denotes a sampling frequency of the input audio stream $b_j[n]$ and each frame corresponds to a different time interval of the input stream $b_j[n]$. Next, the magnitude & phase calculation unit 73*j* calculates a magnitude and a phase for each of N complex-valued samples ($F_{1,j}(i)$, . . . , $F_{N,j}(i)$) based on its length and arctangent function to generate a magnitude spectrum (mj (i)=$m_{1,j}(i)$, . . . , $m_{N,j}(i)$) with N magnitude elements and a phase spectrum (Pj(i)=$P_{1,j}(i)$, . . . , $P_{N,j}(i)$) with N phase elements for the current spectral representation Fj(i) (=$F_{1,j}$ (i), . . . , $F_{N,j}(i)$). Then, the inner product block 73 calculates the inner product for each of N normalized-complex-valued sample pairs in any two phase spectrums Pj(i) and Pk(i) to generate R phase-difference spectrums (pdl(i)=$pd_{1,l}(i)$, . . . , $pd_{N,l}(i)$), each phase-difference spectrum pdl(i) having N elements, where 1<=k<=Q, j≠k, 1<=l<=R, and there are R combinations of two microphones out of the Q microphones. Finally, the Q magnitude spectrums mj(i), the Q phase spectrums Pj(i) and the R phase-difference spectrums pdl(i) are used/regarded as a feature vector fv(i) and fed to the neural network 760/760T. In a preferred embodiment, the time duration Td of each frame is about 32 milliseconds (ms). However, the above time duration Td is provided by way of example and not limitation of the invention. In actual implementations, other time duration Td may be used.

In the training phase, the neural network 760 receives the feature vector fv(i) including the Q magnitude spectrums m1(*i*)~mQ(i), the Q phase spectrums P1(*i*)-PQ(i) and the R phase-difference spectrums pd1(*i*)~pdR(i), and then generates corresponding network output data, including N first sample values of the current frame i of a time-domain beamformed output stream u[n]. On the other hand, the training output data (ground truth), paired with the training input data (i.e., Q*N input sample values of the current frames i of the Q training input streams $b_1[n]$-$b_Q[n]$) for the training examples of the training dataset, includes N second sample values of current frame i of a training output audio stream h[n] and are transmitted to the loss function block 770 by the processor 750. If ω>0 and the neural network 760 is trained to perform the spatial filtering operation only, the training output audio stream h[n] outputted from the processor 750 would be the noisy time-domain output audio data (transformed from a combination of the clean speech audio data 711*a* and the noise audio data 711*b* originated from the ω target sound sources). If ω>0 and the neural network 760 is trained to perform spatial filtering and denoising operations, the training output audio stream h[n] outputted from the processor 750 would be the clean time-domain output audio data (transformed from the clean speech audio data 711*a* originated from the ω target sound sources). If ω=0, the training output audio stream h[n] outputted from the processor 750 would be "zero" time-domain output audio data, i.e., each output sample value being set to zero.

Then, the loss function block 770 adjusts parameters (e.g., weights) of the neural network 760 based on differences between the network output data and the training output data. In one embodiment, the neural network 760 is implemented by a deep complex U-Net, and correspondingly the loss function implemented in the loss function block 770 is weighted-source-to-distortion ratio (weighted-SDR) loss, disclosed by Choi et al., "Phase-aware speech enhancement with deep complex U-net", a conference paper at ICRL 2019. However, it should be understood that the deep complex U-Net and the weighted-SDR loss have been presented by way of example only, and not limitation of the invention. In actual implementations, any other neural networks and loss functions can be used and this also falls in the scope of the invention. Finally, the neural network 760 is trained so that the network output data (i.e., the N first sample values in u[n]) produced by the neural network 760 matches the training output data (i.e., the N second sample values in h[n]) as closely as possible when the training input data (i.e., the Q*N input sample values in $b_1[n]$~$b_Q[n]$) paired with the training output data is processed by the neural network 760.

Figure 7C:
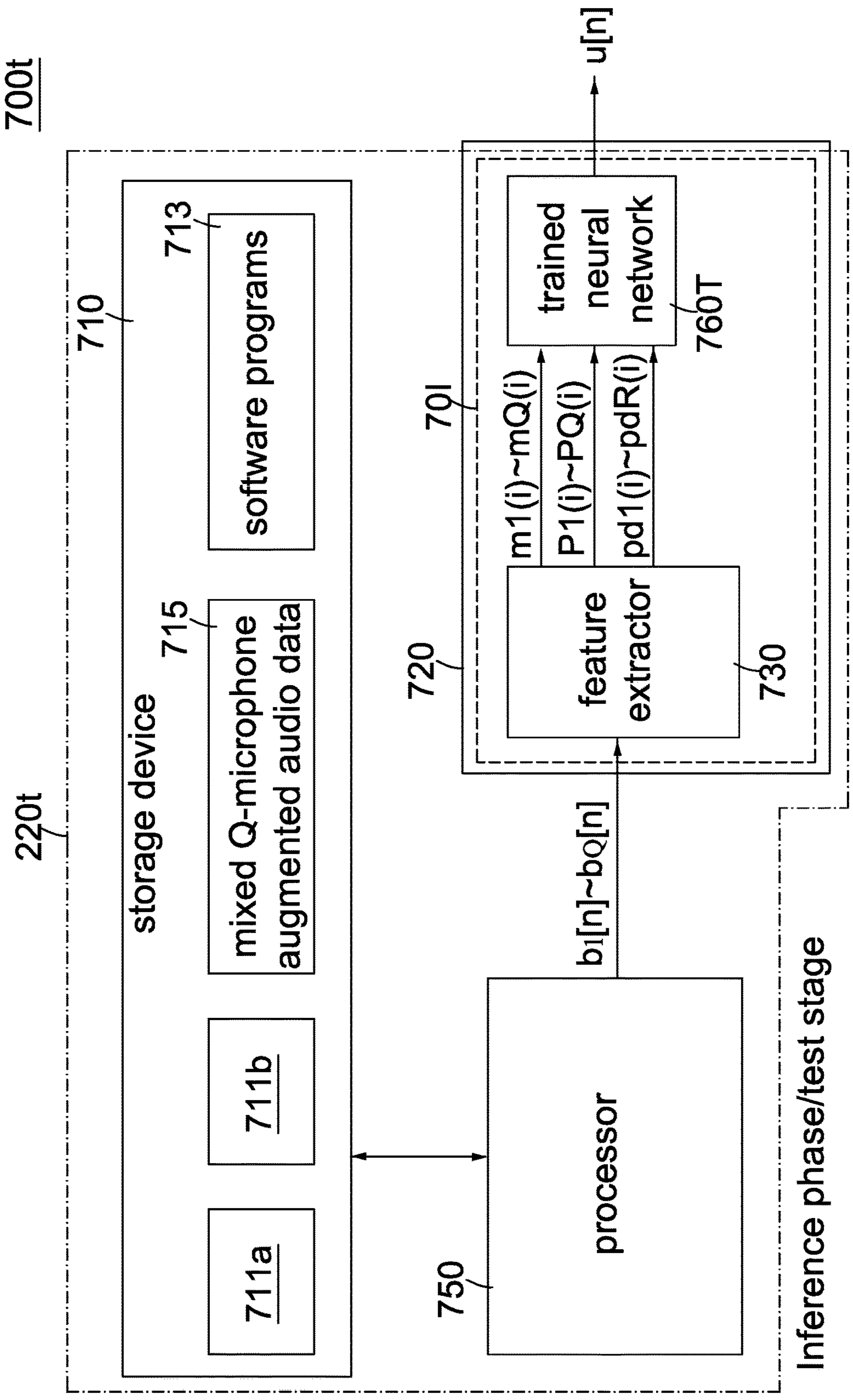
FIG. 7C is an example apparatus of a microphone system **700*t*** in a test stage according to an embodiment of the invention.

The inference phase is divided into a test stage (e.g., the microphone system 700*t* is tested by an engineer in a R&D department to verify performance) and a practice stage (i.e., microphone system 7001 is ready on the market). FIG. 7C is an example apparatus of a microphone system 700*t* in a test stage according to an embodiment of the invention. In the test stage, a microphone system 700*t* includes a beamformer 220*t* only, without the microphone array 210; besides, the clean speech audio data 711*a*, the noise audio data 711*b*, a mixed Q-microphone time-domain augmented audio data 715 and the software programs 713 are resident in the storage device 710. Please note that generations of both the mixed Q-microphone time-domain augmented audio data 712 and 715 are similar. However, since the mixed Q-microphone time-domain augmented audio data 712 and 715 are transformed from a combination of the clean speech audio data 711*a* and the noise audio data 711*b* with different mixing rates and different acoustic environments, it is not likely for the mixed Q-microphone time-domain augmented audio data 712 and 715 to have the same contents. The mixed Q-microphone time-domain augmented audio data 715 are used by the processor 750 as the input audio data (i.e., input audio data $b_1[n]$~$b_Q[n]$) in the test stage. In an embodiment, a neural network module 701, implemented by software and resident in the storage device 720, includes the feature extractor 730 and a trained neural network 760T. In an alternative embodiment, the neural network module 701 is implemented by hardware (not shown), such as discrete logic circuits, ASIC, PGA, FPGA, etc.

Figure 7D:
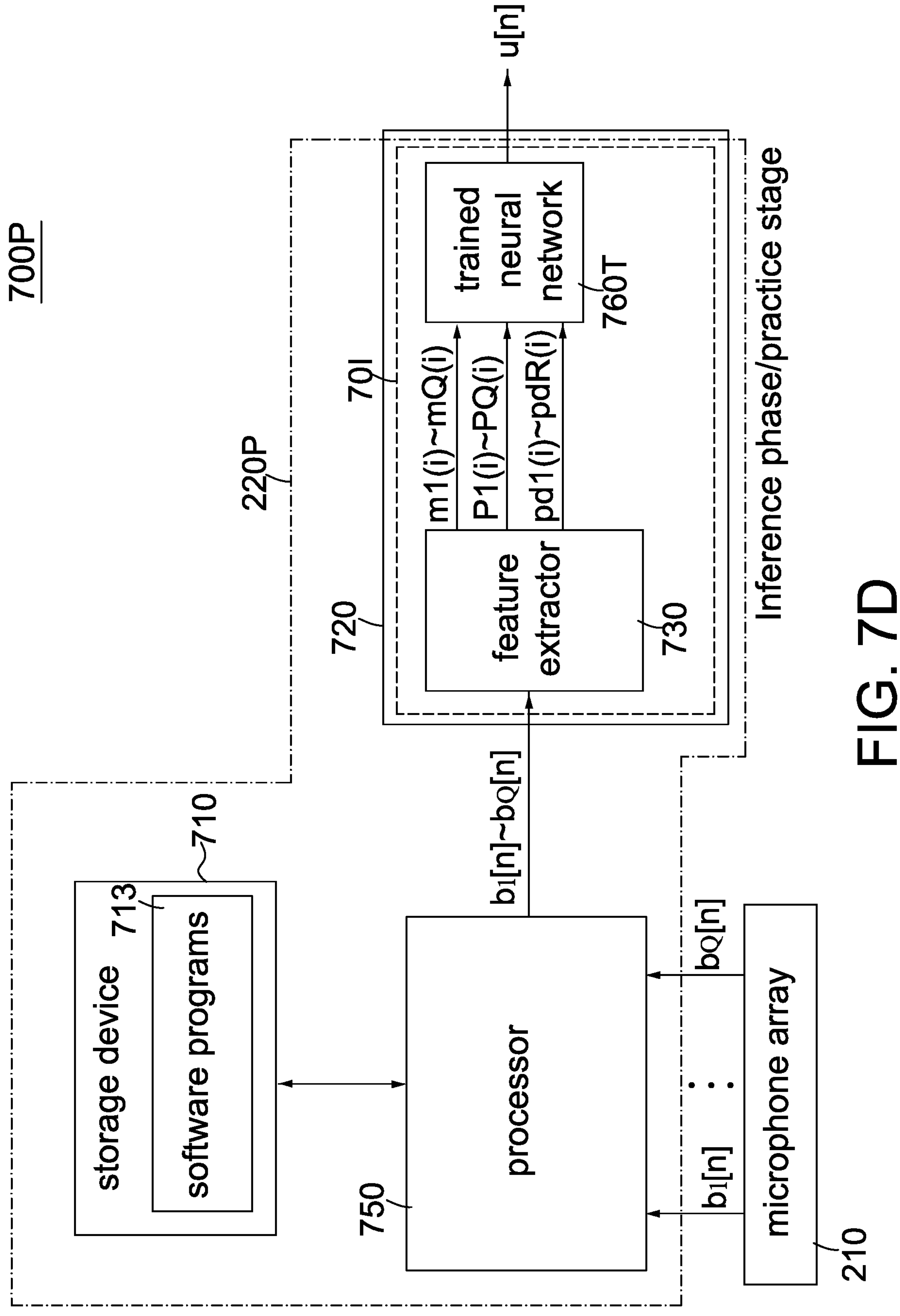
FIG. 7D is an example apparatus of a microphone system 700P in a practice stage according to an embodiment of the invention.

FIG. 7D is an example apparatus of a microphone system 700P in a practice stage according to an embodiment of the invention. In the practice stage, the microphone system 700P includes a beamformer 220P and the microphone array 210; besides, only the software programs 713 are resident in the storage device 710. The processor 750 directly delivers the input audio data (i.e., $b_1[n]$~$b_Q[n]$) from the microphone array 210 to the feature extractor 730. The feature extractor 730 extracts a feature vector fv(i) (including Q magnitude spectrums m1(*i*)-mQ(i), Q phase spectrums P1(*i*)-PQ(i) and R phase-difference spectrums pd1(*i*)-pdR(i)) from Q current spectral representations F1(*i*)-FQ(i) of audio data of current frames i in Q input audio streams ($b_1[n]$~$b_Q[n]$). The trained neural network 760T performs spatial filtering operation with or without denoising operation over the feature vector fv(i) for the current frames i of the input audio streams $b_1[n]$-$b_Q[n]$ based on the at least one TBA, the set M of microphone coordinates and the two energy losses of a dB and p dB to generate time-domain sample values of the current frame i of the clean/noisy beamformed output stream u[n] originated from ω target sound sources inside the at least one TBA, where ω>=0. If ω=0, each sample value of the current frame i of the beamformed output stream u[n] would be equal to zero.

In sum, the higher a dimension of a geometry formed by the Q microphones 211-21Q and the more the number of the spacers, the higher a dimension (i.e., the DR value) for locations of sound sources are able to be distinguished by the beamformer 220. Further, the higher the dimension for the locations of sound sources are able to be distinguished by the beamformer 220, the more precisely a sound source would be located, and thus the better the performance of the spatial filtering with/without denoising filtering in the beamformer 220.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. A microphone system, comprising:

a microphone array comprising Q microphones that detect sound and generate Q audio signals; and a processing unit configured to perform a set of operations comprising:

performing spatial filtering over the Q audio signals using a trained model based on at least one target beam area (TBA) and coordinates of the Q microphones to generate a beamformed output signal originated from ω target sound sources inside the at least one TBA, where ω>=0;

wherein each TBA is defined by r time delay ranges for r combinations of two microphones out of the Q microphones, where Q>=3 and r>=1; and wherein a dimension of a first number for locations of all sound sources able to be distinguished by the processing unit increases as a dimension of a second number for a geometry formed by the Q microphones increases.

2. The system according to claim 1, wherein a union of the r combinations of two microphones for each TBA is all the Q microphones, and r>=ceiling(Q/2).

3. The system according to claim 1, wherein the Q microphones are arranged collinearly, and the first number and the second number are equal to one.

4. The system according to claim 1, wherein the Q microphones are arranged coplanarly but non-collinearly, and wherein the first number and the second number are equal to two.

5. The system according to claim 1, wherein the Q microphones form a 3D shape, but neither collinear nor coplanar, and wherein the first number and the second number are equal to three.

6. The system according to claim 1, wherein the microphone array further comprises:

a first spacer for separating at least one first microphone of the Q microphones from the other microphones of the Q microphones;

wherein a material of the first spacer causes a first energy loss when sound propagates through the first spacer; and wherein the operation of performing the spatial filtering further comprises:

performing the spatial filtering over the Q audio signals using the trained model based on the at least one TBA, the coordinates of the Q microphones and the first energy loss to generate the beamformed output signal originated from the ω target sound sources.

7. The system according to claim 6, wherein the Q microphones are arranged collinearly, and wherein the first number is two and the second number is one.

8. The system according to claim 6, wherein the Q microphones are arranged coplanarly but non-collinearly, and wherein the first number is three and the second number is two.

9. The system according to claim 6, wherein the microphone array further comprises:

a second spacer for separating at least one second microphone of the Q microphones from the other microphones, wherein the first and the second spacers intersect such that the Q microphones are divided into at least three groups;

wherein a material of the second spacer causes a second energy loss when sound propagates through the second spacer; and wherein the operation of performing the spatial filtering further comprises:

performing the spatial filtering over the Q audio signals using the trained model based on the at least one TBA, the coordinates of the Q microphones, the first energy loss and the second energy loss to generate the beamformed output signal originated from the ω target sound sources.

10. The system according to claim 9, wherein the dimension of the first number for the locations of all sound sources able to be distinguished by the processing unit increases as the dimension of the second number for the geometry formed by the Q microphones and a number of the spacers increase.

11. The system according to claim 9, wherein the Q microphones are arranged collinearly, and wherein the first number is three and the second number is one.

12. The system according to claim 1, wherein the operation of performing the spatial filtering further comprises:

performing the spatial filtering and a denoising operation over the Q audio signals using the trained model based on the at least one TBA and the coordinates of the Q microphones to generate a noise-fee beamformed output signal originated from the ω target sound sources.

13. The system according to claim 1, wherein the operation of performing the spatial filtering further comprises:

performing the spatial filtering over a feature vector for the Q audio signals using the trained model based on the at least one TBA and the coordinates of the Q microphones to generate the beamformed output signal;

wherein the set of operations further comprises:

extracting the feature vector from Q spectral representations of the Q audio signals;

wherein the feature vector comprises Q magnitude spectrums, Q phase spectrums and R phase-difference spectrums; and wherein the R phase-difference spectrums are related to inner products for R combinations of two phase spectrums out of the Q phase spectrums.

14. The system according to claim 1, wherein the trained model is a neural network that is trained with the at least one TBA and the coordinates of the Q microphones and a training dataset, and wherein the training dataset are associated with transformations of multiple combinations of clean single-microphone speech audio data and single-microphone noise audio data.

15. The system according to claim 1, wherein the time delay range for each of the r combinations refers to a range of a difference between a first propagation time of sound from a specific sound source to one of the two microphones in a corresponding combination and a second propagation time of sound from the specific sound source to the other one of the two microphones.

* * * * *